Nov. 24, 1959 J. H. BENO 2,913,770
PROCESS FOR POSTCURING THERMOSETTING PLASTICS
Filed Sept. 5, 1956
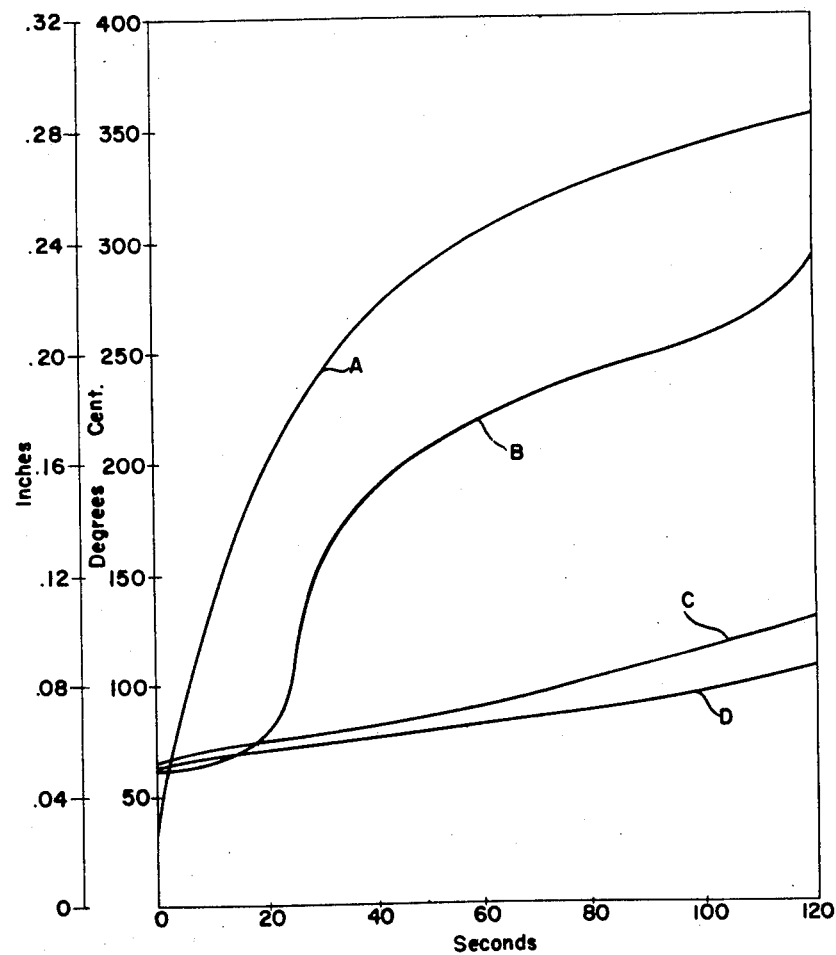
Joseph H. Beno,
*INVENTOR.*
BY.
*ATTORNEY.*

United States Patent Office

2,913,770
Patented Nov. 24, 1959

2,913,770

PROCESS FOR POSTCURING THERMOSETTING PLASTICS

Joseph H. Beno, Los Angeles, Calif., assignor to Hughes Aircraft Company, Culver City, Calif., a corporation of Delaware Application September 5, 1956, Serial No. 608,653

2 Claims. (Cl. 18—48)

The present invention relates to a process for postcuring thermosetting materials, and more particularly relates to a method of postcuring thermosetting resinous plastic materials and components.

The high-strength and low-weight characteristics of many thermosetting plastics such as bonded resin laminates and the ability of some of these materials to withstand high temperatures for short periods of time makes them desirable for use as structural members in high-speed aircraft or missiles. To take advantage of the high-strength characteristics of these high temperature laminates they are frequently used as thin members. However, when such thin laminates are subjected to loading and rapid heating, e.g., aerodynamic heating of the order of a 200° or 300° centigrade rise in temperature in 20 or 30 seconds, the laminates deform and thereby may fail structurally. Such deformation of the laminates is actually similar to a postforming of the plastic caused by the loading and rapid heating to temperatures above those used in the postcuring procedure of the laminates and results from an insufficient cure of the resin used.

Several methods have been developed in the past to overcome this undesirable behavior in thin thermosetting laminates which accomplished the required cure of the resin by further curing it after the usual low temperature postcure. Such laminates have been cured to the desired stage as a part of the molding cycle by applying both heat and pressure simultaneously. This procedure has the inherent disadvantage that the molding cycle is extended thereby requiring the use of expensive equipment, such as a press, for an undesirable length of time for a molded part. Also, it is expensive to equip a molding press for the high temperatures required which would be in the order of 200° or 300° centigrade.

Thin laminated thermosetting materials have also been cured as a separate step after the molding cycle and after the usually required low temperature postcure by slowly increasing the temperature of the plastic material until the resin has received the necessary cure. This type of cure has required a long period of time in the past because slow temperature increases had been deemed necessary to give gaseous matter within the material time to escape and thereby prevent delamination or blistering. In curing the materials by such a process, the materials are heated at a low temperature, e.g., approximately 100° to 150° centigrade, and then slowly over a long period of time, in the order of several hours, increasing the temperature until the desired degree of cure was obtained. This procedure has the disadvantage of requiring that the material be subjected to high temperatures for a long period of time. Exposure to these high temperatures for long periods of time causes thermal deterioration of such plastic materials. Charring and a weakening of the material or part can result from such thermal deterioration. While the thermal deterioration may be minimized by heating the materials within a nonoxidizing medium, the equipment necessary for utilizing a nonoxidizing medium to surround the materials while they are being cured is very expensive.

It has been discovered that the deforming of thermosetting plastic materials when subjected to loading during very rapid rates of temperature increases to high temperatures may be prevented by a certain postcure of the plastic material which does not subject the materials to high pressures or high temperatures for long periods of time.

It is an object of the present invention to provide an improved method of postcuring thermosetting plastic materials which prevents deforming of such materials when they are later subjected to loading and rapid heating at high temperatures.

It is a further object of the present invention to provide an improved method for postcuring thermosetting plastic materials to prevent deforming under applications of load and rapid temperature increases with a minimum of equipment and time.

It is a further object of the present invention to provide an improved method of postcuring thermosetting plastic materials at very high temperatures with a minimum of thermal deterioration of the material.

In accordance with the present invention, there is provided an improved process for preventing deforming of thermosetting plastic materials when subjected to loading and rapid heating to high temperatures in which the material is rapidly heated to a temperature at least equal to the highest temperature that will be encountered in the application of the material, maintaining the material at this high temperature for a period of time that is sufficient for the resin to cure to the degree necessary to prevent appreciable deforming when subjected to loading and rapid heating, and cooling the material to room temperature.

The novel features which are believed to be characteristic of the invention, both as to its organization and method of operation, together with the further objects and advantages thereof, will be better understood from the following description considered in connection with the accompanying drawing in which:

The single figure of the drawing is a graph showing several curves which represent typical plots of the deflection of thermosetting resin laminates plotted against the time during which the laminates were subjected to a predetermined temperature rise and loading.

As an example of a process embodying the principles of the present invention, a fiberglass phenolic laminate specimen of .06 inch thickness is placed in a furnace after the usually required low temperature postcure of such a laminate and the temperature of the specimen is raised to 350° centigrade in a very short period of time of the order of 20 to 25 seconds. This temperature is maintained constant for 40 to 120 seconds and then the specimen is cooled to room temperature. This rapid or flash heating of the specimen may be accomplished by using an infra red light source and suitable focusing means or by utilizing a dielectric heating furnace. Also, in certain applications a molten metal bath may be utilized to raise the temperature of the specimen at a rapid rate. The particular method by which the temperature of the specimen is raised is not important; however, the rate at which the specimen is heated is important. This rate will depend to a large extent upon the thickness of the specimen, and to a lesser extent upon the resin and reinforcing material of the specimen. The rate must be slow enough to insure that the specimen will be heated throughout during the temperature rise. Uniform heating of the specimen is not necessary, but large gradients of temperature within the specimen may cause blistering or other dangerous effects. Also, it is important that the flash heating be performed on materials which have a minimum of absorbed moisture. The time during which a specimen is subjected to the high temperature need only be long enough to cure the resin to the degree necessary to prevent appreciable deforming when the specimen is later subjected to loading and rapid heating. The maximum time that the specimen may be subjected to this high furnace temperature is not critical, but need not be longer than the minimum time required to effect the desired cure of a resin. Since high temperatures will cause thermal deterioration in thermosetting plastics, the preferred procedure would subject the material to the high furnace temperature for as short a period as possible.

Referring to the drawing which illustrates the postforming behavior of several specimens of thermosetting laminates when subjected to a rapid temperature rise and loading, curve A represents the temperature vs. time relationship to which the specimens were subjected. The specimens tested were glass reinforced thermosetting resin bonded laminates of equal dimensions and were subjected to a maximum stress of approximately 21,000 lbs. p.s.i. Curve B represents a typical plot of deflection vs. time of the laminate that was not postcured to prevent deforming when subjected to rapid heating to high temperatures and loading. Curve C represents a typical plot of deflection vs. time of the laminate that was postcured by a method embodying the principles of the present invention and in which the specimen was maintained at the furnace temperature for forty seconds. Curve D represents a typical plot of deflection vs. time of a specimen that was postcured by the method embodying the principles of the present invention and in which the specimen was maintained at the furnace temperature for 120 seconds. As the drawing clearly illustrates, the specimens that were not postcured by the process of the present invention deformed to a much greater extent when subjected to rapid heating and loading than the specimens that were postcured by the process of the present invention. The drawing also illustrates that the length of time during which a thermosetting material is maintained at the furnace temperature is not critical once the resin has received the required degree of cure.

It should be understood that the process of the present invention is not limited to a cure for plastic materials that are used in aircraft applications, but can also be used to prevent the deforming of thermosetting plastic materials that are subjected to rapid heating to high temperatures and loading in other applications, such as bearing members, etc.

In accordance with the present invention, a process for preventing deforming of thermosetting plastic materials when subjected to loading and rapid heating at high temperatures is provided in which the material is flash-heated to a temperature at least equal to the highest temperature that will be encountered in the use of the material. The material is maintained at this temperature for a period of time that is sufficient for the resin to cure to the degree necessary to prevent appreciable deforming when subjected to loading and rapid heating, and the material is then cooled to room temperature.

What is claimed is:

1. The process of treating thermosetting phenolic resin material which previously has been substantially cured but still is capable of being postformed, to prevent deforming of the material when subjected to loading and rapid heating to high temperatures, which comprises: rapidly raising the temperature of the material to a temperature above its curing temperature in not less than about 20 seconds to a value at least as high as that to which the material will be subjected during subsequent use; maintaining the material at said temperature from about 40 to about 120 seconds; and cooling the material to ambient temperature.

2. The process of treating a thermosetting phenolic resin laminate, which previously has been substantially cured but still is capable of being postformed when subjected to loading and rapid heating to high temperatures, which comprises: rapidly heating the laminate to a temperature above the curing temperature of the resin employed therein in not less than about 20 seconds to a temperature at least as high as that to which the laminate will be subjected during subsequent use; maintaining the laminate at said temperature for about 40 to about 120 seconds; and cooling the laminate to ambient temperature.

References Cited in the file of this patent

UNITED STATES PATENTS

| | | |
|---|---|---|
| 2,395,675 | Luth | Feb. 26, 1946 |
| 2,433,643 | Beach et al. | Dec. 30, 1947 |
| 2,790,206 | Cofek | Apr. 30, 1957 |